United States Patent [19]

Ruppe

[11] Patent Number: 5,203,663
[45] Date of Patent: Apr. 20, 1993

[54] VEHICLE RESTRAINING MECHANISM

[75] Inventor: Michael J. Ruppe, Hawthorn Woods, Ill.

[73] Assignee: Dock Leveler Manufacturing, Inc., Malvern, Ark.

[21] Appl. No.: 705,069

[22] Filed: May 23, 1991

[51] Int. Cl.$^5$ .............................................. B65G 69/00
[52] U.S. Cl. ...................................... 414/401; 414/584
[58] Field of Search ...................... 414/396, 401, 584; 14/71.1, 71.3; 410/7

[56] References Cited

U.S. PATENT DOCUMENTS

| | | | |
|---|---|---|---|
| 4,127,856 | 11/1978 | Bickel | 14/71.1 X |
| 4,267,748 | 5/1981 | Grunewald et al. | 414/401 X |
| 4,282,621 | 8/1981 | Anthony et al. | 14/71.1 |
| 4,373,847 | 2/1983 | Hipp et al. | 414/401 |
| 4,443,150 | 4/1984 | Hahn et al. | 414/401 |
| 4,488,325 | 12/1984 | Bennett et al. | 14/71.3 |
| 4,555,211 | 11/1985 | Metz | 414/401 |
| 4,576,508 | 3/1986 | Dickinson | 404/6 |
| 4,589,813 | 5/1986 | Hagen et al. | 414/401 |
| 4,630,989 | 12/1986 | Davey | 414/401 |
| 4,634,334 | 1/1987 | Hahn et al. | 414/401 |
| 4,735,542 | 4/1988 | Fisher et al. | 414/401 |
| 4,784,567 | 11/1988 | Hageman et al. | 414/401 |
| 4,830,563 | 5/1989 | Yeakle | 414/401 |
| 4,887,954 | 12/1989 | Gregerson et al. | 414/401 |
| 4,963,068 | 10/1990 | Gelder | 414/584 X |
| 4,973,213 | 11/1990 | Erlandsson | 414/401 |
| 4,988,254 | 1/1991 | Alexander | 414/401 |
| 5,026,242 | 6/1991 | Alexander | 414/401 |

*Primary Examiner*—Michael S. Huppert
*Assistant Examiner*—James Keenan
*Attorney, Agent, or Firm*—Finnegan, Henderson, Farabow, Garrett & Dunner

[57] ABSTRACT

Restraint for preventing inadvertent horizontal movement away from a loading dock of a vehicle on a driveway adjacent the loading dock, the restraint comprising an elongated restraint arm including a bracket at a first end thereof shaped to engage a component of the vehicle, the restraint arm being connected to the driveway for movement of the first end between a lowered position proximate the driveway and a raised position wherein the bracket is disposed to engage the vehicle component, a piston-cylinder arrangement for selectively biasing the restraint arm to the raised position, and a cam structure at the second end of the restraint arm for locking the restraint arm in the raised position in response to a horizontal force acting on the restraint arm in a direction away from the loading dock and for permitting movement of the restraint arm between the raised and lowered positions in response to a horizontal force acting on the restraint arm toward the loading dock or a vertical force acting on the restraint arm toward the driveway.

20 Claims, 6 Drawing Sheets

VEHICLE RESTRAINING MECHANISM

BACKGROUND OF THE INVENTION

1. Field of the Invention

The invention relates to a restraining device which acts to impede inadvertent movement of vehicles such as motor trucks and semi-trailers away from a loading dock.

2. Description of Related Art

The loading and unloading of trucks or trailers backed up to a loading dock frequently involve the use of mobile cargo handlers such as forklift trucks or pallet jacks. If the truck or trailer should unexpectedly move away from the loading dock, operators of such mobile cargo handlers could be injured due to the unexpected space between the rear of the truck and the loading dock.

To prevent such unexpected motion away from the loading dock, trailer or truck restraining devices have been developed which consist of a movable post or arm actuated by mechanical, electrical, pneumatic or hydraulic means to a position in engagement with the rear of the truck. In particular, all over-the-road trailers and motor trucks require an "ICC Bar" proximate the rear of the truck to prevent an automobile from underriding the truck in the event of a rear-end collision. The typical restraining devices are adapted to engage the ICC bar. The known restraining devices, however, require manual activation presenting the opportunity for inadvertent failure to activate a restraining device or the opportunity for injury because of the necessity of having personnel in the area of the loading dock carrier interface to place the restraining device in position.

The present invention is a trailer or truck restraining device which automatically engages the truck as it backs into position adjacent the loading dock thereby overcoming the disadvantages of the known devices. Additional advantages of the invention are set forth in part in the description which follows, and in part will be obvious from the description, or may be learned by practice of the invention.

SUMMARY OF THE INVENTION

The advantages of the invention may be realized and attained by means of the instrumentalities and combinations particularly pointed out in the appended claims.

In accordance with the invention, a restraint for preventing horizontal movement away from a loading dock of a vehicle on a driveway adjacent the loading dock comprises an elongated restraint arm including a bracket at a first end thereof shaped to engage a component of the vehicle, the restraint arm being connected to the driveway for movement of the first end between a lowered position proximate the driveway and a raised position wherein the bracket is disposed to engage the vehicle component; means for selectively biasing the restraint arm to the raised position; and means for locking the restraint arm in the raised position in response to a force acting on the restraint arm in a substantially horizontal direction away from the loading dock and for permitting movement of the restraint arm between the raised and lowered positions in response to a force acting on the restraint arm toward the loading dock or toward the driveway.

Preferably, the restraint includes a plate fixed to the driveway and having a cam slot defining a path of movement for a second end of the restraint arm between raised and lowered positions, and a cam eccentrically, pivotally connected to the second end of the restraint arm, the cam being disposed in the slot for movement between the raised and lowered positions in response to a force horizontally toward the loading dock or vertically toward the driveway acting on the restraint arm proximate the first end thereof or for locking engagement with the slot in response to a force horizontally away from the loading dock acting on the restraint arm proximate the first end thereof.

In a preferred embodiment, the restraint includes an elongated shroud pivotally connected at one end thereof to the driveway and the other end thereof slidingly engaging the restraint arm proximate the first end thereof, the shroud substantially covering the restraint and being disposed to follow movement of the restraint arm between raised and lowered positions.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE PREFERRED EMBODIMENT

Reference will now be made in detail to the present preferred embodiments of the invention, examples of which are illustrated in the accompanying drawings.

In accordance with the invention, a restraint for preventing horizontal movement away from a loading dock of a vehicle on a driveway adjacent the loading dock comprises an elongated restraint arm including a bracket at a first end thereof shaped to engage a component of the vehicle, the restraint arm being connected to the driveway for movement of the first end between a lowered position proximate the driveway and a raised position wherein the bracket is disposed to engage the vehicle component.

Figure 1:
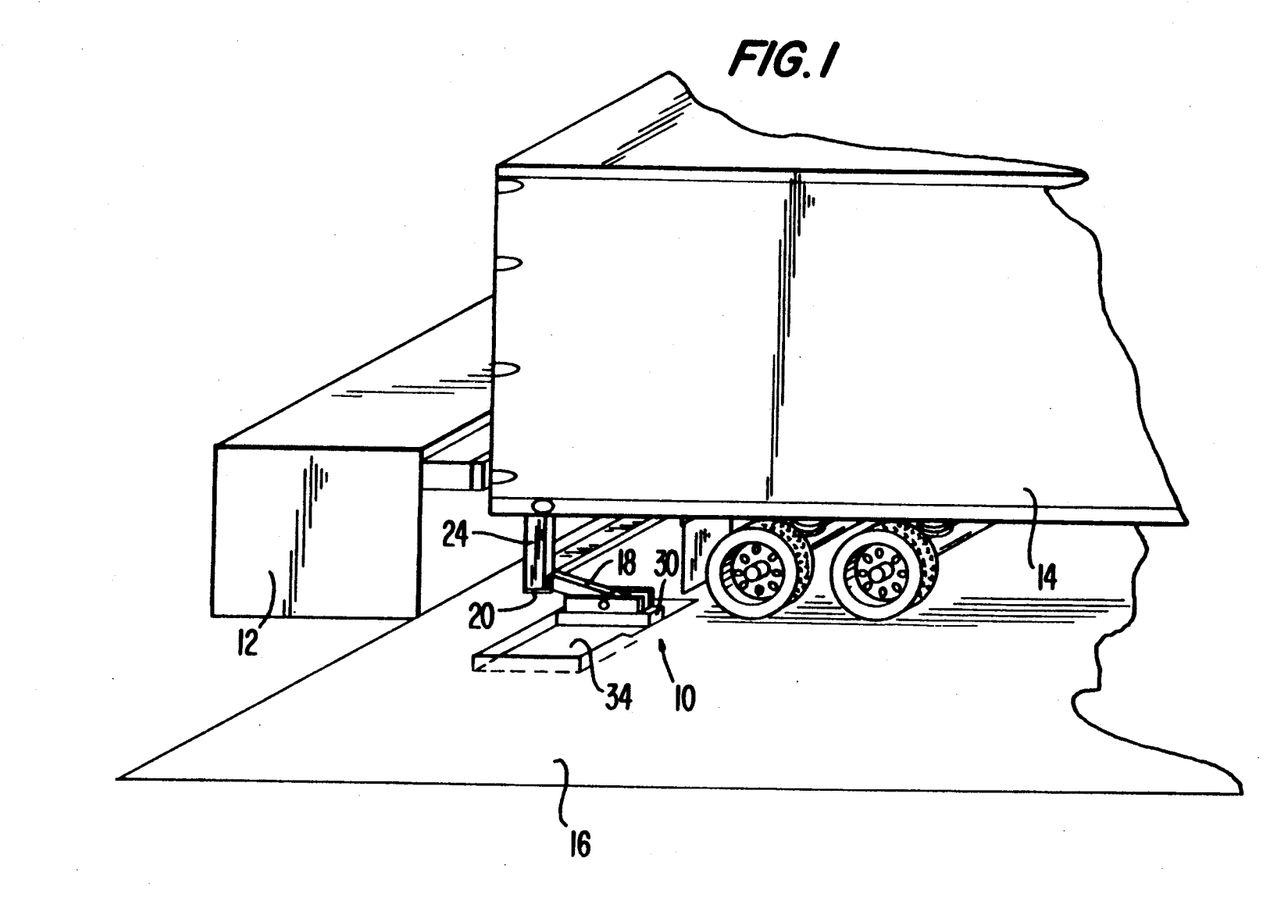
FIG. 1 is a perspective view of a loading dock and truck with the restraint of the invention depicted in operative engagement with the truck.

As depicted in FIG. 1, the restraint 10 is disposed for preventing inadvertent horizontal movement away from loading dock 12 of a vehicle 14 on a driveway 16 adjacent loading dock 12.

Figure 2:
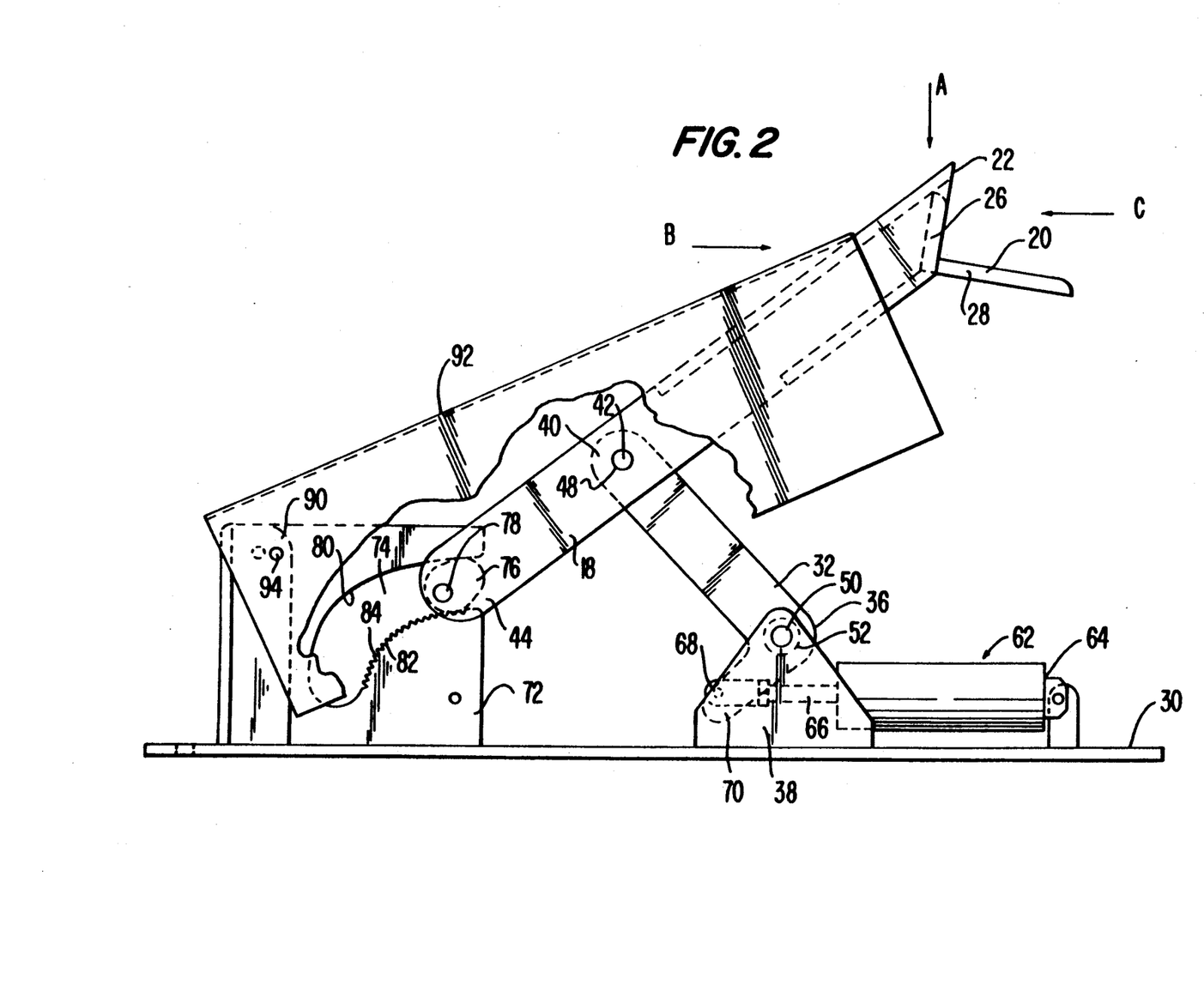
FIG. 2 is a partially cut-away side view of a preferred embodiment of the invention.

In a preferred embodiment, as depicted in FIG. 2, the restraint includes an elongated restraint arm 18 including a bracket 20 at a first end 22 shaped t engage a component of a vehicle. Bracket 20 is preferably shaped to engage an ICC-bar 24 (FIG. 1). Accordingly, bracket 20 is L-shaped having a substantially vertical component 26 disposed to engage the forward portion of ICC-bar 24 and a substantially horizontal component 28 disposed to engage the bottom portion of ICC-bar 24.

The restrain 10 preferably includes base 30 and pivot arm 32 for connecting restraint arm 18 to driveway 16 for movement between a lowered position proximate driveway 16 and a raised position wherein bracket 20 engages ICC-bar 24 of truck 14. Base 30 may be fixed to driveway 16 or, as depicted in FIG. 1, may be attached to driveway 16 in a manner which allows pivotal movement about the longitudinal axis of base 30 to selectively place restraint 10 in a cavity 34 in driveway 16. The latter embodiment permits placement of restraint 10 below the surface of the driveway to facilitate snow removal and the like.

As depicted in FIG. 2, elongated pivot arm 32 preferably includes a first end 36 pivotally connected to driveway 16 through base 30 and transversely spaced upwardly extending flanges 38 fixed to base 30. Pivot arm 32 is movable between raised and lowered positions and is connected at its second end 40 at a point 42 intermediate the first end 22 and the second end 44 of restraint arm 18.

Figure 3:
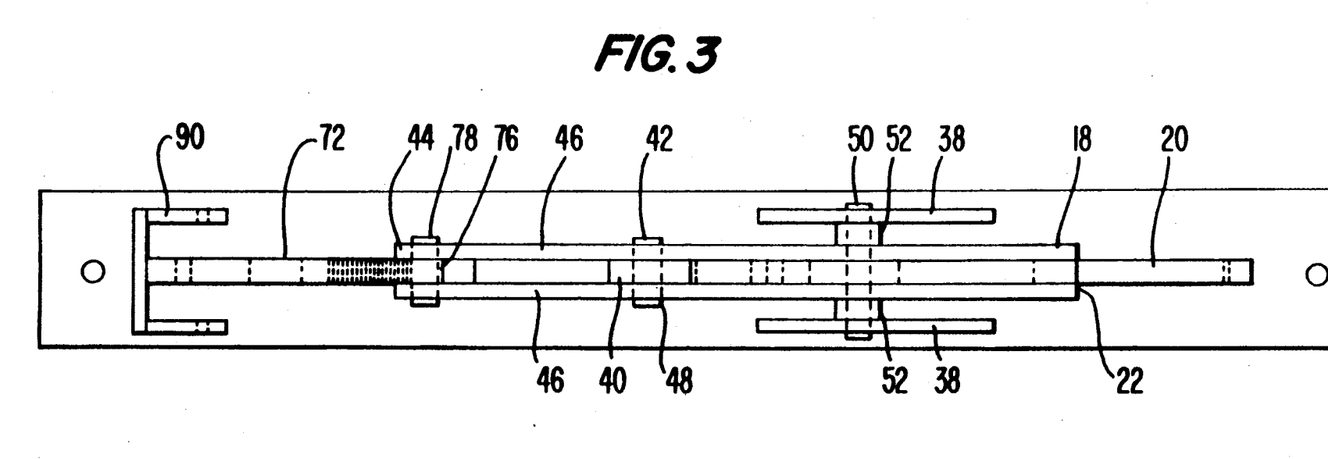
FIG. 3 is a top plan view of the invention of FIG. 2 with the shroud removed.

As depicted in FIGS. 2 and 3, restraint arm 18 includes two spaced, parallel elements 46 defining an elongated channel therebetween. Second end 40 of pivot arm 32 is disposed between elements 46 of restraint arm 18 and is connected thereto by transverse pin 48 for pivotal movement with respect to restraint arm 18. First end 36 of pivot arm 32 is disposed between spaced flanges 38 and connected thereto by pin 50. Bushings 52 are disposed around pin 50 and extend between flanges 38 and pivot arm 32. Restraint arm 18 in the lowered position may rest against bushings 52.

Figure 6:
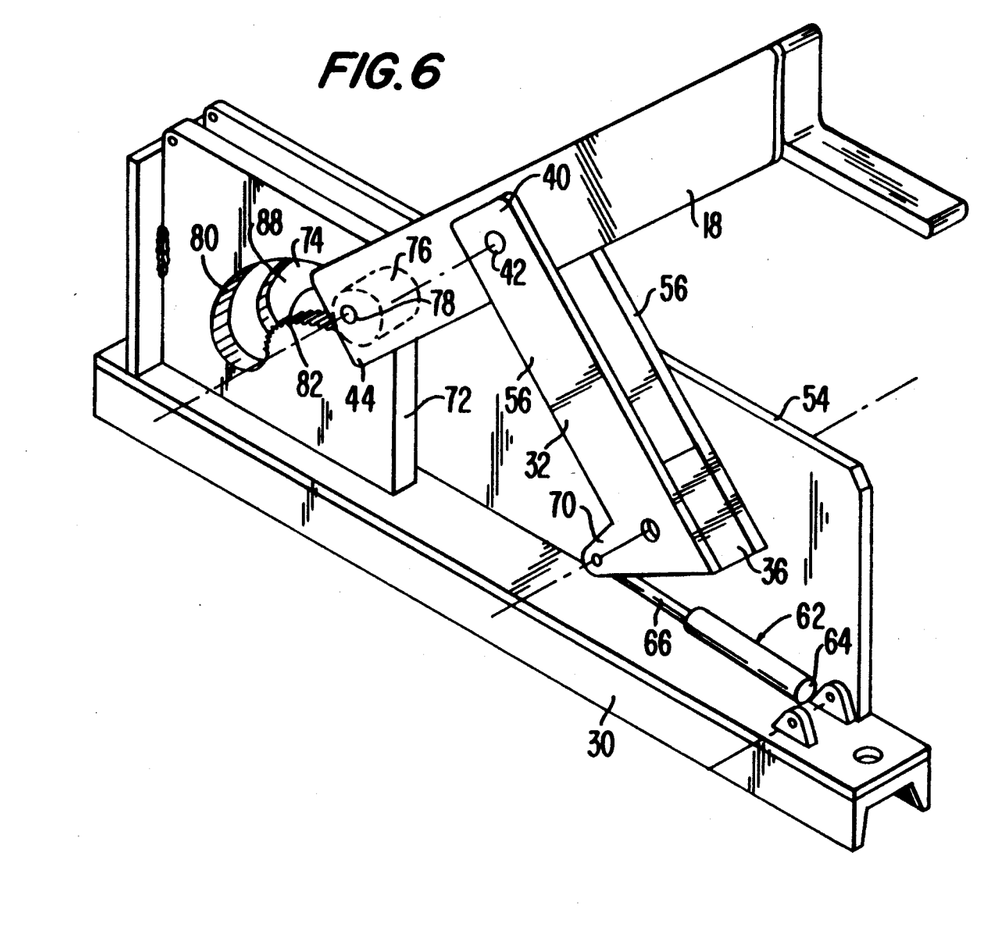
FIG. 6 is a perspective view of an alternative embodiment of the invention.
Figure 7:
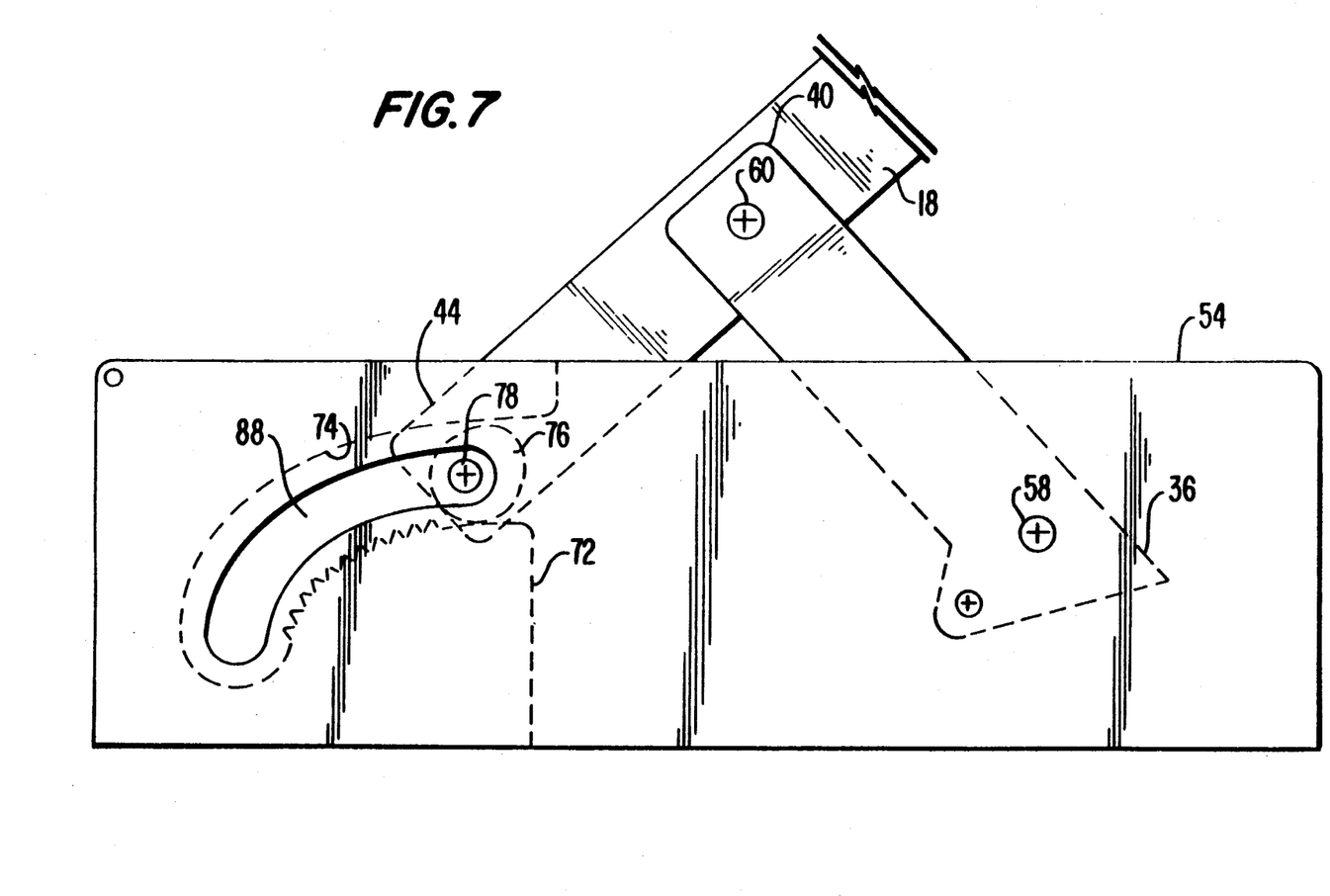
FIG. 7 is a partial side view of the embodiment of FIG. 6.

In an alternative embodiment depicted in FIGS. 6 and 7, base 30 includes a pair of parallel, spaced walls 54 defining an elongated channel in which restraint arm 18 and pivot arm 32 are disposed for movement. Pivot arm 32 includes two opposed elements 56 defining a central channel for movably receiving restraint arm 18. The first end 36 of pivot arm 32 is disposed between and connected to opposed walls 54 by pin 58 for pivotal movement between raised and lowered positions. Second end 40 of pivot arm 32 receives restraint arm 18 between elements 56 and is connected thereto a point 42 by transverse pin 60 for relative pivotal movement.

The restraint of the invention also includes means for selectively biasing the restraint arm to the raised position. In the preferred embodiment depicted in FIG. 2, the biasing means includes a pneumatic piston-cylinder arrangement 62 having one end of the cylinder 64 connected to base 30. Piston rod 66, extending from the piston-cylinder 62, is connected at its distal end 68 to flange 70 integrally extending from one end 36 of pivot arm 32. The arrangement of piston-cylinder 62 and flange 70 of pivot arm 32 are selected with consideration of the pivotal connection points of the first and second ends of pivot arm 32 to selectively move restraint arm 18 between raised and lowered positions by moving pivot arm 32 between raised and lowered positions.

Although in the preferred embodiment the biasing means is a pneumatic piston-cylinder arrangement, alternative biasing means include a gas spring or a spring. As will be apparent from the discussion presented below, the biasing means should resiliently bias the restraint arm to the raised position such that forces acting on the restraint arm 18 can move the restraint arm downward in opposition to the bias. Thus, a hydraulic piston-cylinder could be used if pressure in the hydraulic fluid reservoir is pneumatically maintained whereby hydraulic fluid could be returned to the reservoir against the bias of air pressure in response to forces acting on restraint arm 18. Also, a positive pressure, closed-loop hydraulic fluid system that is controlled via pressure relief valves or positive pressure vs. positive displacement pumps can be used. Depending upon the biasing means used, selective movement of restraint arm 18 to the lower position may be achieved by release of pressure allowing gravity to move restraint arm 18 or may be positively accomplished through a two-way cylinder arrangement.

In accordance with the invention, the restraint includes means for locking the restraint arm in the raised position in response to a force acting on the restraint arm in a substantially horizontal direction away from the loading dock and for permitting movement of the restraint arm between the raised and lowered positions in response to a force acting on the restraint arm toward the loading dock o toward the driveway. As depicted in the embodiment of FIGS. 2 and 3, the locking and permitting means comprises plate 72 fixed to and centrally extending from base 30, plate 72 having a cam slot 74 defining a path for movement of the second end 44 of restraint arm 18 between raised and lowered positions. The locking and permitting means further comprises cam 76 eccentrically, pivotally connected by pin 78 to the second end 44 of restraint arm 18. Cam 76 is disposed in cam slot 74 for movement between raised and lowered positions.

Figure 4:
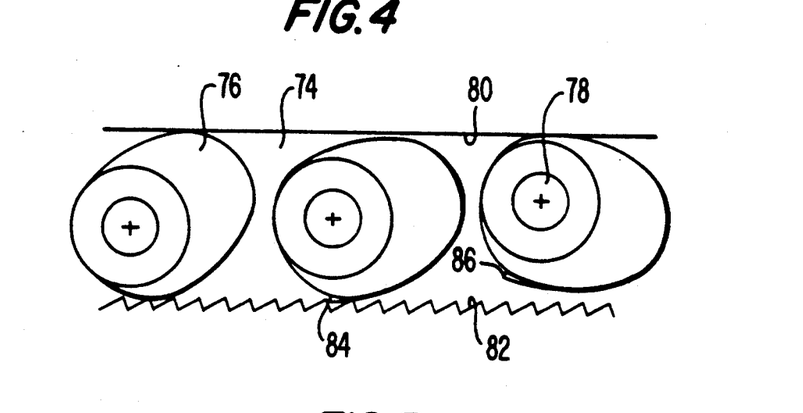
FIG. 4 is a diagrammatic side view of the relationship of the cam and cam slot of the invention.

As depicted in FIG. 4, cam 76 is ovoid or egg-shaped and is eccentrically pivotally connected to pin 78 such that rotation of cam 76 about the axis of pin 78 permits placement of ovoid cam 76 with either its short dimension transverse the cam slot 74 or its long dimension transverse cam slot 74. As depicted in FIG. 4, cam slot 74 is defined by opposed upper wall 80 and lower wall 82 which are spaced a distance less than the long dimension of cam 76 and greater than the short dimension of cam 76. Upper wall 80 is generally smooth and lower wall 82 includes a plurality of spaced transverse teeth 84 projecting therefrom. Cam 76 includes at least one transverse tooth 86 projecting from the lower surface thereof for engagement with transverse teeth 84 on lower wall 82 of cam slot 74. By this arrangement, when cam 76 is biased toward upper wall 80 by movement of pin 78 connected to second end 44 of restraint arm 18, am 76 presents its short dimension transverse cam slot 74 and may be slidably translated within cam slot 74 between upper and lower positions. On the other hand, if cam 76 is biased toward lower wall 82 of cam slot 74, projecting tooth 86 is disposed to engage projecting teeth 84 and any effort to translate cam 76 toward the lower position in cam slot 74 will cause cam 76 to rotate about the axis of pin 78 presenting the long dimension transverse cam slot 74 thereby wedging cam 76 in cam slot 74 and preventing movement toward the lower position.

Thus, as depicted in FIG. 2, the point 42 at which second end 40 of pivot arm 32 is pivotally connected to restraint arm 18 is selected such that any vertical force toward driveway 16 acting on restraint arm 18 (arrow A, FIG. 2) between point 42 and first end 22 and any horizontal force acting on restraint arm 18 (Arrow B, FIG. 2) between point 42 and first end 22 in the direction away from cam plate 72 will cause restraint arm 18 to pivot about point 42 biasing cam 76 toward upper wall 80 of cam slot 74 thereby permitting the second end 44 of restraint arm 18 to move between upper and lower positions and permitting restraint arm 18 to move between upper and lower positions against a bias imposed by piston-cylinder 62. Point 42 for pivotal connection between restraint arm 18 and pivot arm 32 is also selected such that the greater weight of restraint arm 18 is between point 42 and first end 22 such that release of biasing pressure from piston-cylinder 62 will allow gravity to pivot restraint arm 18 about point 42 placing cam 76 against upper wall 80 of cam slot 74 allowing restraint arm 18 to move to the lowered position. On the other hand, because of the orientation of restraint 10 with respect to loading dock 12, as depicted in FIG. 1, any movement of truck 14 away from loading dock 12 will impose on first end 22 a force away from loading dock 12. Referring to FIG. 2, such a horizontal force acting on first end 22 (Arrow C) pivots restraint arm 18 about point 42 bringing cam 76 into contact with lower wall 82 of cam slot 80 thereby wedging cam 76 in cam slot 74 and preventing movement of restraint arm to its lowered position.

The ability of restraint arm 18 to move to its lower position against bias in response to a horizontal force toward loading dock 12 acting proximate first end 22 of restraint arm 18 permits truck 14 to back over restraint 10. When backing toward dock 12, ICC-bar 24 engages restraint arm 22 imposing a horizontal force toward dock 12 (Arrow B) which moves restraint arm 18 against bias to allow the truck to reach the loading dock; the bias causes restraint arm 18 to return to its raised position engaging ICC-bar 24 in bracket 20. This automatic engagement feature avoids the necessity of selectively activating the truck restraint once the truck is in position at the loading dock thereby avoiding inadvertent failure to do so or the necessity of having personnel in the area where trucks are backing to the loading dock. Of course, restraint 10 may be operated remotely such that it is normally in the lowered position and is only moved to the raised position after a truck is in position or at the time a truck is beginning to back in to the loading dock.

The cam arrangement also allows restraint arm 18 to move against bias toward the lower position in response to a vertical force on restraint arm 18 proximate first end 22 to compensate for vertical changes in position of truck 14 as cargo is loaded or unloaded. In view of the resilience of a truck,s normal suspension system, a forklift driving into the rear of the truck will cause vertical movement of the truck end. If restraint 10 were not able to respond to such movement, damage to the structure could occur. The cam arrangement, therefore, permits this vertical movement and as the truck rises from the lowered position caused by the weight of the forklift, first end 22 follows the movement of the truck in view of the bias of piston-cylinder 62.

Figure 5:
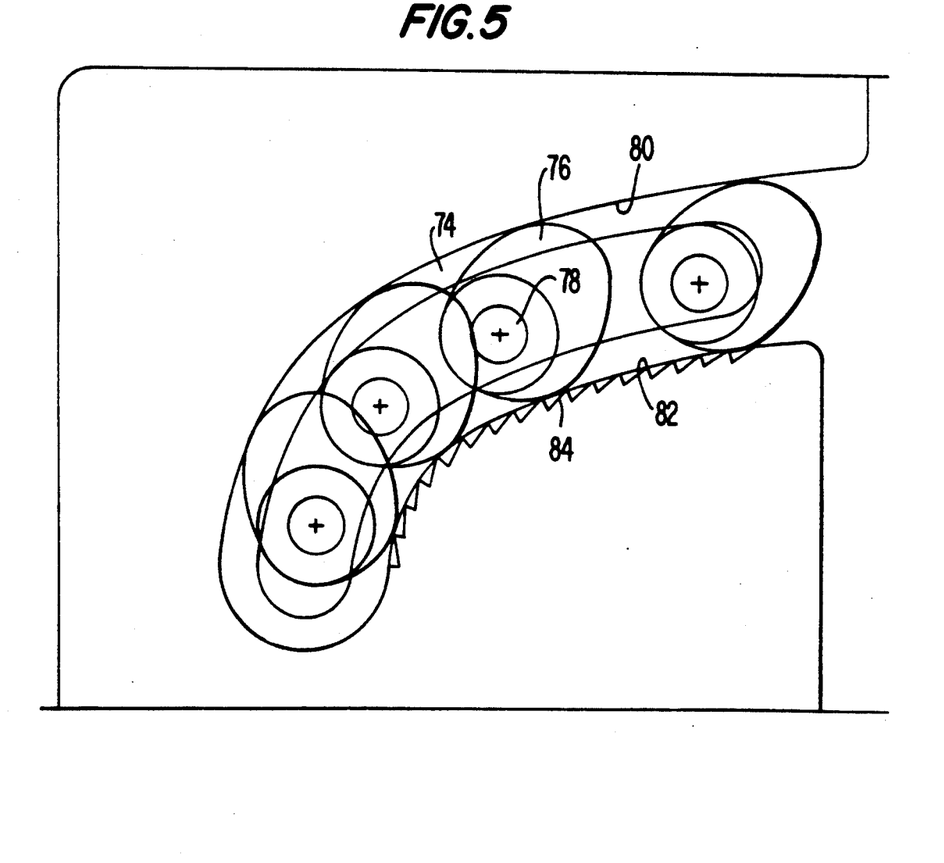
FIG. 5 is an enlarged side view of the cam slot and cam of the invention depicting different operative positions.

Preferably, lower wall 82 of cam slot 74 includes transverse teeth 84 throughout substantially all of its length as depicted in FIG. 5. Because trucks may have differing clearances to driveway 16 and because of the vertical movement of the truck during loading, restraint 10 must be effective to prevent horizontal movement away from the loading dock at various positions of restraint arm 18 between the raised and lowered position. By including teeth through substantially the full length of lower wall 82, cam 76 of restraint arm 18 may be wedged in a locked position in slot 74 regardless of the position of restraint arm 18 between the upper and lower positions.

Structurally, as depicted in FIGS. 2 and 3 in the preferred embodiment, cam 76 is pivotally disposed between elements 46 of restraint arm 18 at the second end 44 thereof. Cam plate 72 is also slidably disposed between elements 46 allowing cam 76 to be moved within cam slot 74 as second end 44 of restraint arm 18 moves relative to cam plate 72.

In the alternative embodiment depicted in FIGS. 6 and 7, opposed walls 54 include guide slots 88 slidably receiving opposed ends of pin 78 for guiding movement of second end 44 of restraint arm 18.

In the preferred embodiment depicted in FIGS. 2 and 3, base 30 includes at the end proximate cam plate 72 a vertically extending flange element 90 to which is pivotally connected shroud 92. Shroud 92 is elongated and defines an internal channel for substantially enclosing restraint 10. Shroud 92 is pivotally connected at point 94 to flange element 90 and the other end is disposed to slidably engage the upper surface of restraint arm 18. Thus, shroud 92 follows movement of restraint arm 18 between upper and lower positions. Shroud 92 serves to protect restraint 10 from snow, dirt and other debris and also acts as a protective guide surface against which ICC-bar 24 slidably moves as a truck backs toward loading dock 12 thereby imposing the horizontal force toward loading dock 12 on restraint arm 18 to move restraint arm 18 against bias toward a lower position. This shroud may be easily replaced should it become dented or worn. Naturally, the weight of shroud 92 acting on restraint arm 18 must be less than the biasing force of piston-cylinder 62.

It will be apparent to those skilled in the art that various modifications and variations may be made to the truck restraint of the invention without departing from the scope or spirit of the invention.

What is claimed is:

1. A restraint for preventing horizontal movement away from a loading dock of a vehicle on a driveway proximate the loading dock, the restraint comprising:
    an elongated restraint arm having opposed first and second ends, said first end including a bracket shaped to engage a component of the vehicle, said second end of the restraint arm being connected to the driveway adjacent the loading dock with said first end positioned closer to the loading dock than said second end for movement of the first end between a lowered position proximate the driveway and a raised position wherein the bracket is disposed to engage the vehicle component;
    means for selectively biasing the restraint arm to the raised position; and
    means for locking the restraint arm in the raised position in response to a force acting on the restraint arm in a substantially horizontal direction away from the loading dock and for permitting movement of the restraint arm between the raised and lowered positions in response to a force acting on the restraint arm between a substantially horizontal direction toward the loading dock and a substantially vertical direction toward the driveway.

2. The restraint of claim 1 also including an elongated pivot arm having opposed first and second ends, the first end of the pivot arm being pivotally connected to the driveway adjacent the loading dock for movement between raised and lowered positions and the second end of the pivot arm being pivotally connected to the restraint arm at a point between the first and second ends of the restraint arm.

3. The restraint of claim 2 wherein the biasing means selectively moves the pivot arm to the raised position thereby moving the restraint arm to the raised position.

4. The restraint of claim 2 wherein the locking and permitting means comprises a plate fixedly connected to the driveway, the plate having a cam slot defining a path for movement of the second end of the restraint arm between the raised and lowered positions, and a cam eccentrically, pivotally connected to the other end of the restraint arm, the cam being disposed in the slot for movement between the raised and lowered positions in response to a force horizontally toward the loading dock or vertically toward the driveway acting on the restraint arm proximate the first end thereof and for locking engagement with the slot in response to a force horizontally away from the loading dock acting on the restraint arm proximate the first end thereof.

5. A restraint for preventing horizontal movement of a vehicle away from a loading dock, the restraint comprising:
   a base;
   a restraint arm having a locking end and an opposed cam end, the restraint arm being connected to the base for selective movement between a raised position wherein the locking end is disposed to engage the vehicle and a lowered position;
   means for selectively resiliently biasing the restraint arm to the raised position; and
   cam means connecting the cam end to the base for preventing movement of the restraint arm in the raised position in response to the horizontal movement of the vehicle away from the loading dock, while permitting movement of the restraint arm in the raised position against the biasing means in response to vertical movement of the vehicle or horizontal movement of the vehicle toward the loading dock.

6. The restraint of claim 5 wherein the base is fixed to a driving surface adjacent the loading dock.

7. The restraint of claim 6 wherein the locking end of the restraint arm is proximate the loading dock and when the restraint arm is in the raised position the locking end engages the vehicle proximate the rear thereof.

8. The restraint of claim 7 wherein the vehicle includes an ICC bar proximate the rear thereof and wherein the locking end includes an L-shaped bracket having a vertical component disposed in the raised position to engage a forward portion of the ICC bar and a horizontal component disposed in the raised position to engage a bottom portion of the ICC bar.

9. The restraint of claim 5 also including a pivot arm having opposed first and second ends, the first end being attached to the base for pivotal movement between raised and lowered positions and the second end being pivotally attached to the restraint arm at a predetermined point between the locking end and the cam end.

10. The restraint of claim 9 wherein the biasing means connects the base to the pivot arm for selectively moving the pivot arm to the raised position thereby moving the restraint arm to the raised position.

11. The restraint of claim 10 wherein the biasing means is a pneumatic piston and cylinder.

12. The restraint of claim 10 wherein the biasing means is a gas spring.

13. The restraint of claim 10 wherein the biasing means is a spring.

14. The restraint of claim 9 wherein the cam means comprises a locking cam pivotally fixed to the cam end of the restraint arm and a cam housing fixed to the base and having a cam slot disposed to receive the locking cam, the cam slot defining a path for the locking cam during movement of the restraint arm between the raised and lowered position, the cam slot and locking cam cooperating to fix the cam end in the raised position when the restraint arm proximate the locking end is subjected to a substantially horizontal force in a direction away from the loading dock and to allow the locking cam to move in the cam slot when the restraint arm proximate the locking end is subjected to a substantially vertical force toward a driveway proximate the loading dock or a substantially horizontal force in a direction toward the loading dock.

15. The restraint of claim 14 wherein the locking cam has an ovoid cross-sectional shape defined by a long dimension and a short dimension, is eccentrically pivotally attached to the cam end, and includes a transverse tooth downwardly projecting from a surface thereof.

16. The restraint of claim 15 wherein the cam slot is defined by upper and lower opposed walls spaced a distance less than the long dimension of the locking cam and greater than the short dimension of the locking cam, the upper wall being generally smooth and the lower wall including a plurality of spaced transverse teeth projecting therefrom.

17. The restraint of claim 16 wherein the predetermined point of pivotal attachment between the pivot arm and restraint arm is selected whereby movement of the vehicle either vertically toward the driveway or horizontally toward the loading dock against the restraint arm proximate the locking end places the locking cam into sliding engagement with the upper wall of the cam slot permitting movement of the restraint arm between the raised and lowered positions and whereby horizontal movement of the vehicle away from the loading dock acts on the locking end to place the locking cam transverse tooth into engagement with the teeth on the lower wall and to rotate the locking cam about its pivotal attachment to the cam end to wedge the locking cam in the cam slot thereby preventing movement of the restraint arm.

18. The restraint of claim 5 wherein the cam means comprises a locking cam pivotally fixed to the cam end of the restraint arm and a cam housing fixed to the base and having a cam slot disposed to receive the locking cam, the cam slot defining a path for the locking cam during movement of the restraint arm between the raised and lowered position, the cam slot and locking cam cooperating to fix the cam end in the raised position when the restraint arm proximate the locking end is subjected to a horizontal force in a direction away from the loading dock and to allow the locking cam to move in the cam slot when the restraint arm proximate the locking end is subjected to a substantially vertical force toward a driveway proximate the loading dock or a substantially horizontal force in a direction toward the loading dock.

19. The restraint of claim 5 including an elongated shroud pivotally connected at one end thereof to the base and at the other end thereof slidingly engaging the restraint arm proximate the locking end, the shroud substantially covering the restraint and being disposed to follow movement of the restraint arm between the raised and lowered positions.

20. The restraint of claim 5 wherein a driveway proximate the loading dock is formed with a recess adjacent the loading dock and the base is attached to the driveway for pivotal movement about a longitudinal axis of the base between an upright position and a stored position wherein the restraint is disposed below a surface of the driveway.

* * * * *

UNITED STATES PATENT AND TRADEMARK OFFICE
CERTIFICATE OF CORRECTION

PATENT NO. : 5,203,663

DATED : April 20, 1993

INVENTOR(S) : Michael J. Ruppe

It is certified that error appears in the above-identified patent and that said Letters Patent is hereby corrected as shown below:

Claim 14, column 8, line 9, "position" should read --positions--.

Claim 18, column 8, line 54, "position" should read --positions--.

Signed and Sealed this

Thirtieth Day of November, 1993

Attest:

BRUCE LEHMAN

Attesting Officer

Commissioner of Patents and Trademarks